United States Patent Office 2,790,427
Patented Apr. 30, 1957

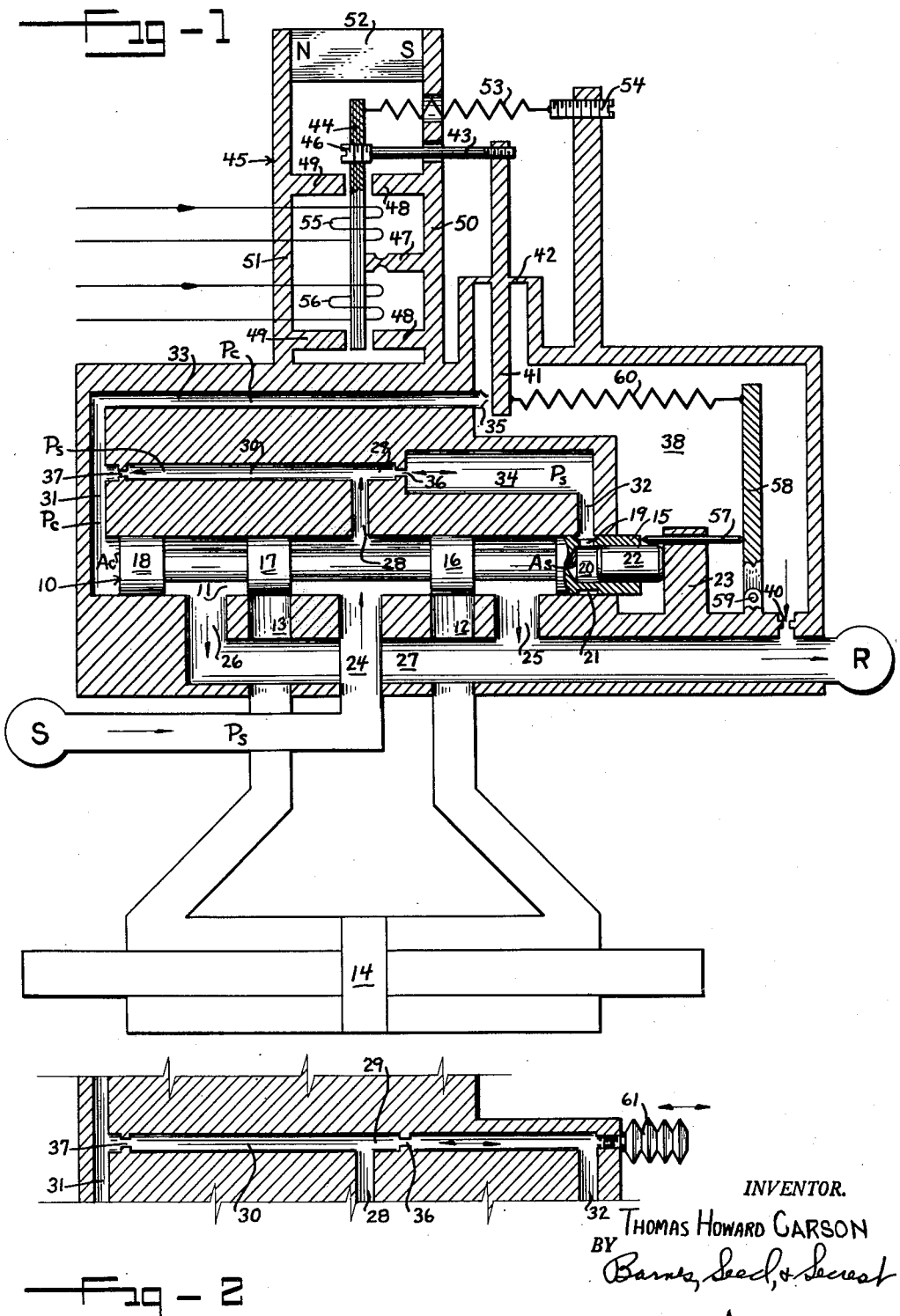

2,790,427

FLOW CONTROL SERVO VALVE

Thomas Howard Carson, Seattle, Wash., assignor to Ex-Cell-O Corporation, Detroit, Mich.

Application September 23, 1955, Serial No. 536,117

8 Claims. (Cl. 121—46.5)

The present invention relates generally to improvements in high performance servo valves of the type in which the position of a slide valve determines the flow of pressurized fluid from a supply source to a ram or other load. More particularly, the invention concerns such a servo valve in which the slide valve position is controlled by an electro-hydraulic actuator functioning to convert a low-level electrical signal into a proportional hydraulic control pressure reduced by the actuator from the supply source and acting on one end of the slide valve in opposition to the pressure of the supply source acting on a differential area thereof. The pressure of the supply source is generally considered as constant, but in actual practice it is usually subject to pressure fluctuations which may have a fluctuation frequency as high as or greater than 250 cycles/sec. This invention aims to so dynamically balance the slide valve that the accuracy and sensitivity of the servo will not be effected by such pressure fluctuations.

As a further object the invention aims to provide an improved arrangement for providing the differential area on the slide valve and supplying this area with fluid.

Still another object of the invention is to isolate the electrical section of the electro-hydraulic actuator from fluid controlled by the hydraulic section of the actuator.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a schematic view of my servo valve; and

Fig. 2 is a fragmentary schematic view illustrating a modification in the dampening portion of the servo valve.

Referring to Fig. 1, it is seen that the position of a slide valve 10 in a bore 11 determines the flow of fluid through actuator passages 12, 13 to and from opposite sides of an actuator such as a ram 14. For purposes of example the slide valve is shown as having four spools 15-18, the first of which is formed with a longitudinal center bore 20 open to the forward end of the valve. Radial passages 19 extend from the bore 20 to a circumferential groove 21 in the spool 15. A piston 22 is received in the bore 20 forwardly of the passages 19 and projects beyond the valve to constantly bear by its outer end against a stop member 23. It will be noted that the foot of the bore 20 is denoted As while the rear end face of the slide valve is designated by Ac, and since As is smaller than Ac it is hereinafter referred to as the differential area. The slide valve is positioned by pressures Pc, Ps applied to the areas Ac, As, respectively, the letters c and s denoting "control" and "supply."

The center portion of the bore 11 is in continuous communication with a supply source S of fluid under pressure Ps by a supply passage 24 located between the actuator passages 12, 13. Endwise of the latter there is provided a pair of discharge passages 25, 26 leading to a return passage 27 for a reservoir or accumulator R. The spacing and length of the center spools 16, 17 mate with those of the ports of the actuator passages 12, 13 so that one of the latter is always being fed with pressurized fluid from the supply passage 24 while the other actuator passage is dumping into a respective one of the discharge passages 25, 26.

Some of the fluid under the supply pressure Ps continuously flows from the mouth of the supply passage 24 into a passage 28. The latter connects by forwardly and rearwardly extending branches 29, 30 with a dampening chamber 34 and an end passage 31, respectively. A cross passage 32 connects the forward end of the dampening chamber 34 with the bore 11 in the immediate vicinity of the groove 21 so that the differential area As will be supplied with fluid from the dampening chamber. The end passage 31 communicates by its ends with the rear end of the bore 11 and a nozzle passage 33 which extends forwardly to a pressure control nozzle 35. Dampening and supply orifices 36, 37 are located in the branches 29, 30, respectively.

The nozzle 35 discharges into a discharge chamber 38 in turn connecting by a return orifice 40 with the return passage 27. Flow through the nozzle is varied by a restricting flapper 41 which has a pressure sealing elastic pivot in the form of a metal diaphragm 42 located intermediate its ends so that one end of the flapper, termed the outer end, is isolated from the discharge chamber. This outer end of the flapper threadably receives the foot end of a rod 43 for transferring torque from the armature 44 of a torque motor 45. The head 46 of this rod is threaded into the armature 44 and has threads of a different pitch than those at the foot of the rod so that a turning thereof will adjust the distance between the armature and the flapper.

The armature is pivoted by means of a hinge 47 mounted midway between the air gaps of two opposed pairs of poles 48, 49. These are supported by respective end plates 50, 51 between which a permanent magnet 52 is clamped. Holes are provided through the end plate 50 for the passage of the rod 43 and a tension spring 53 which extends between the armature and a zero adjusting screw 54. The two coils of the motor are denoted 55, 56 and they are arranged so that application of a differential current thereto causes magnetization of the armature 44. As a result one end of the armature is polarized north and the other south depending on the direction of the differential current. The armature will, therefore, be attracted toward two diagonally opposite of the poles 48, 49 and repelled by the other two poles. These forces of attraction and repulsion result in a rotation of the armature about its hinge 47 and a deflection thereof in the vicinity of the adjusting screw 46. This deflection is in turn transferred to the outer end of the flapper 41 by the rod 43 so that the flapper teeters about the diaphragm 42 thereby causing a corresponding deflection of the inner end of the flapper in the vicinity of the nozzle 35. With this arrangement the magnitude of the forces urging deflection of the inner end of the flapper is proportional to the magnitude of the differential current input signal to the coils 55, 56 and the direction of motion of the flapper into a more or less restricting position of the nozzle 35 is determined by which of the coils has the larger current. The differential screw effect of the threaded head and foot of the rod 43 is utilized to set the size of gap between the nozzle and the flapper, and hence to set the nozzle back pressure Pc when the current differential between the coils 55, 56 is zero and the armature 44 is centered between the pairs of poles 48, 49.

Feedback from the slide valve 10 to the flapper 41 is accomplished by a stem 57, a beam 58 pivoted at 59, and a feedback tension spring 60, all located in the discharge C chamber 38. The stem 57 has a slide journal through the stop member 23 and seats by its ends against the nose of the slide valve and the beam 58 so that endwise deflection of the slide valve is transferred to the beam. Feedback spring 60 extends between the beam and the flapper and functions to transpose deflection of the outer end of the beam into a spring force exerted on the inner end of the flapper 41. It will be noted that the point of engagement between the stem 57 and the beam 58 is purposely spaced toward the latter's pivot 59 from the feedback spring 60 so that deflection of the slide valve 10 will be multiplied by the beam. Accordingly, it is seen that the stem 57, beam 58 and feedback spring 60 cause an output or feedback force to be fed back and exerted on the flapper 41 which is proportional to the deflection of the slide valve. This feedback force is in such a direction as to oppose the input force exerted by the torque motor through the rod 43 due to the differential current input to the coils 55, 56. Final adjustment to offset an initial tension load present in the feedback spring is obtained by adjusting the load on the spring 53 by the screw 54. This permits the slide valve to be readily given a zero position for the condition of zero differential current input. This zero position of the slide valve corresponds to the position whereat the spools 16, 17 block flow through the ports of the actuator passages 12, 13, but may also correspond to a position of finite flow for particular applications.

For a complete understanding of the dynamic problems involved in a servo valve of the general type described herein it should be kept in mind that the supply pressure $Ps$ commonly exceeds 2,000 p. s. i. and that many applications of the valve, such as in aircraft, dictate that it have very high dynamic performance while being dimensionally as small as possible. To illustrate this size factor, the passages 28—33 may have a diameter of only .007 inch and the slide valve may be only two inches long.

To dynamically balance the servo valve of the present invention I have determined that each fluctuation in the source S of high pressure fluid supplied to the supply passage 24 must be felt by the differential area $As$ at the same time that it is felt by the valve area $Ac$. More specifically, a pressure fluctuation impulse arriving at the juncture of the branches 29, 30 and the passage 28 should be caused to travel therefrom to the differential area $As$ and the end area $Ac$ in the same period of time. It is for this reason that I have provided the dampening orifice 36 and dampening chamber 34 between the passage 28 and the differential area $As$ and namely, to increase the time taken by an impulse to travel from the passage 28 to the differential area. No hard and fast rule can be stated as to the size of the dampening chamber in view of possible variances in other dimensions of the servo valve, but I have found that when the passages 29—33 all have substantially a diameter of .007, excellent results are achieved by giving the dampening chamber a diameter approximately forty times, and a length approximately five times, the diameter of such passages. Thus it is seen that the dampening effect of the supply orifice 37 and the constant flow through such orifice and its related passages to the nozzle 35 can be balanced by a dampening orifice in combination with a dampening chamber of the proper volume. In some servo valve constructions space limitations or other considerations may make it desirable not to expand the branch 29 forwardly of the dampening orifice 36 into a dampening chamber. In view of this fact I have illustrated an alternative construction in Fig. 2, and namely the providing of a stiff bellows 61 to communicate with the forward end of the branch 29. The bellows will not only dampen because of its volume but also because of its expansion characteristic, and these can be established to cumulatively give the desired dampening effect.

Continuing to a review of the operation of the servo, there are always going to be two opposing forces acting on the flapper 41, namely an input force resulting from a differential current in the torque motor coils 55, 56, and an opposing output or feedback force resulting from a deflection of the feedback spring 60. This deflection is in turn caused by a deflection of the slide valve 10 as multiplied by the beam 58 after being transferred to the latter by the stem 57. Ignoring the reaction force of the feedback spring 60 on the beam 58, there is always a force (ideally constant) determined by the supply pressure $Ps$ acting on the differential area $As$ at the forward end of the slide valve and a variable force at the foot end of the valve which is determined by the control pressure $Pc$ acting on the area $Ac$ at the rear end of the slide valve. As before mentioned, the control pressure $Pc$ is determined by the amount of restriction of the nozzle 35 by the flapper 41, and hence is determined by the difference between the aforesaid input and feedback forces.

I prefer to have $As$ approximately equal to one-half of $Ac$ so that the slide valve 10 is in equilibrium when the control pressure is nearly equal to one-half of the supply pressure $Ps$. This arrangement gives a maximum possible equal range of control pressures above and below the equilibrium value since $Pc$ would equal $Ps$ if the nozzle 45 were fully restricted and would approach zero if there were no restriction of the nozzle.

For purposes of example, assume that the flapper 41 and slide valve 10 are at their zero equilibrium positions and a differential current is applied to the torque motor coils 55, 56 such as to result in an input force urging the flapper toward the nozzle. This will restrict the flow from the nozzle to a proportionate amount and hence will raise the control pressure $Pc$, thereby causing the slide valve to shift forwardly to the right. As the valve so moves the beam 58 is pivoted toward the flapper and deflects the feedback spring 60 so that the latter exerts a proportional feedback force on the flapper which will tend to relieve the control perssure $Pc$ upstream of the nozzle. Accordingly, at some deflection of the slide valve, the feedback force will competely balance the input force and the control pressure $Pc$ will be returned to its equilibrium value of one-half the supply pressure $Ps$. The new position of the slide valve will be proportional to the magnitude and direction of the input differential current. Therefore, the flows to and from the load 14, being determined by the positions of the slide valve, will likewise be proportional to the differential current.

Assume some disturbance has caused the slide valve to shift to the left of its equilibrium position as viewed in the drawing. The beam 58 will follow the slide valve toward the flapper, resulting in less tension of the feedback spring 60, and hence in a movement of the flapper toward the nozzle. Therefore, there will be an increase in the control pressure $Pc$ acting on the left end of the slide valve and the latter will be caused to move to the right to correct the original error. As it so moves to the right, the valve will push the stem 57 such as to deflect the beam 58 away from the flapper and, through the feedback spring 60, cause an increased feedback force moving the flapper such as to lower the pressure $Pc$ as the valve moves to its correct position. When no error exists the pressure $Pc$ will have returned to its equilibrium value.

Some error in the exact balances abovedescribed will exist due to the reaction of the feedback spring force and the force due to the zero-adjusting spring 53. As these forces are small compared to the hydraulic balance forces of many pounds, their effect will be small and be neglected. In this regard, it should be noted that the springs 53 and 60 are of the nature of instrumentation springs to provide a torque balance at the flapper and do not provide the forces which actuate the slide valve.

It is thought that the invention and its advantages will have been clearly understood from the foregoing detailed description of the now-preferred illustrated embodiments. Minor changes in the details of construction can self-evidently be resorted to without departing from the spirit of the invention and it is therefore my intention that no limitations be implied and that the hereto annexed claims be given the broadest interpretation to which the employed language fairly admits.

I claim:

1. In a servo valve unit, a valve, a source of fluid under pressure subject to pressure fluctuations, first and second opposed hydraulic forces supplied with fluid from said source and acting on the valve such as to tend to move the valve in opposite directions, control means operatively associated with said source and first said force selectively varying such force to thereby obtain differentials between said opposed forces, and dampening means independent of said control means and operatively associated with said source and said second force for equalizing the time lag between the occurrence of a fluctuation in the source pressure and the actual feel of said fluctuation by said second force with the time lag between said occurrence and the actual feel of said fluctuation by said first force.

2. In a servo valve unit, a slide valve, a source of fluid under pressure subject to pressure fluctuations, a first chamber open to one end of the valve and having a supply orifice communicating with said source and a nozzle leading from the chamber, means for selectively restricting the flow from said nozzle to thereby vary the pressure in said first chamber by the rate of flow through the nozzle, and a second chamber open to the other end of said valve and communicating via an orifice with said source of fluid, said second chamber being adapted to cause the time lag between the occurrence of a fluctuation in the source pressure and the actual feel of said fluctuation by said other end of the valve to be dampened into equalization with the time lag between said occurrence and the actual feel of said fluctuation by the first-mentioned end of the valve.

3. In a servo valve unit, a slide valve having a differential area at one of its ends, a source of fluid under pressure subject to pressure fluctuations, a control chamber open to the other end of said slide valve and having a supply orifice communicating with said source and a nozzle leading from the chamber, means for selectively restricting the flow from said nozzle to thereby vary the pressure in said control chamber by the rate of flow through the nozzle, and a dampening chamber open to said differential area and communicating via an orifice with said source of fluid, said dampening chamber being adapted to cause the time lag between the occurrence of a fluctuation in the source pressure and the actual feel of said fluctuation by said differential area to be dampened into equalization with the time lag between said occurrence and the actual feel of said fluctuation by said other end of the valve.

4. The structure of claim 3 in which said dampening chamber is partly defined by a bellows.

5. In a servo valve unit, a slide valve having a neutral endwise position and formed with a longitudinal bore open to one end of the valve, the foot of the bore comprising a differential area with respect to the other end of the valve, a piston slidably mounted in said bore and projecting by its outer end as a prolongation of the valve, a supply of fluid under a substantially constant pressure to said differential area and acting on the inner end of the piston, a stop independent of the slide valve and arranged to be engaged by the outer end of the piston, a supply of fluid under a variable pressure to the other end of the slide valve and having a neutral pressure value at which the slide valve is balanced, a nozzle leading from the latter said supply of fluid and controlling the said variable pressure by the rate of flow of fluid therethrough, a flapper arranged to restrict the flow from the said nozzle and having a neutral position determining the said neutral pressure value of the supply of fluid controlled by the nozzle, means for applying various input forces at will to the flapper to correspondingly vary the restriction to flow from the nozzle and thus vary the said variable pressure to thereby cause respective endwise movements of the slide valve, spring means engaging the flapper and arranged to exert an output force thereon in opposition to the said input force when the spring means is deformed, a pivoted beam engaging said spring means, a rod extending between the piston end of the slide valve and said beam, said rod and beam being arranged to transfer the amount of endwise movement of the slide valve from its said neutral position into a multiplied deformation of the spring means whereby a said output force is created counteracting the particular input force on the flapper causing such endwise movement to responsively return said flapper to its neutral position and thereby automatically balance the slide valve at a position determined by the magnitude of the particular input force.

6. In a servo valve unit, a slide valve having a neutral endwise position and formed with a longitudinal bore open to one end of the valve, the foot of the bore comprising a differential area with respect to the other end of the valve, a piston slidably mounted in said bore and projecting by its outer end as a prolongation of the valve, a source of fluid under pressure subject to pressure fluctuations, a control chamber open to said other end of the valve and having a supply orifice communicating with said source and a nozzle leading from the chamber, a dampening chamber communicating via an orifice with said source of fluid and communicating with said bore between said differential area and the inner end of said piston, a stop independent of the slide valve and arranged to be engaged by the outer end of the piston, a flapper arranged to restrict the flow from the said nozzle and having a neutral position determining the said neutral pressure valve of the supply of fluid controlled by the nozzle, means for applying various input forces at will to the flapper to correspondingly vary the restriction to flow from the nozzle and thus vary the said variable pressure to thereby cause respective endwise movements of the slide valve, and feedback means operatively associated with said slide valve and said flapper for automatically translating the amount of endwise movement of the slide valve from its said neutral position into an output force counteracting the particular input force on the flapper causing such endwise movement to responsively return said flapper to its neutral position and thereby automatically balance the slide valve at a position determined by the magnitude of the particular input force, said dampening chamber being adapted to cause the time lag between the occurrence of a fluctuation in the source pressure and the actual feel of said fluctuation by said differential area to be dampened into equalization with the time lag between said occurrence and the actual feel of said fluctuation by said other end of the valve.

7. In a servo valve unit, a nozzle for controlling a variable pressure by the rate of flow of fluid therethrough, a flapper arranged to restrict the flow from said nozzle, a torque motor having an armature on which magnetic forces are exerted in response to differential current inputs to the motor, a diaphragm serving as a hinge support for the flapper intermediate of its ends and isolating said torque motor from fluid discharging from the nozzle, and means external of said diaphragm and operatively interconnecting the armature of said torque motor with said flapper so that by applying various differential currents to the motor at will, responsive forces will be applied to the flapper to correspondingly vary the restriction to flow from the nozzle.

8. In a servo valve unit, a flapper, a torque motor having an armature on which magnetic forces are exerted in response to differential current inputs to the motor, a diaphragm serving as a hinge support for the flapper intermediate of its ends and isolating said torque motor from one end of the flapper, and means external of said diaphragm with respect to said end of the flapper and operatively interconnecting the armature of said torque motor with said flapper so that by applying various differential currents to the motor at will, responsive forces will be applied to the flapper.

References Cited in the file of this patent

FOREIGN PATENTS 730,965     Great Britain _____ June 1, 1955